US008296291B1

(12) United States Patent
Desjardins

(10) Patent No.: US 8,296,291 B1
(45) Date of Patent: Oct. 23, 2012

(54) SURFACING RELATED USER-PROVIDED CONTENT

(75) Inventor: Chad Desjardins, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 500 days.

(21) Appl. No.: 11/954,971

(22) Filed: Dec. 12, 2007

(51) Int. Cl.
G06F 7/00 (2006.01)
G06F 17/30 (2006.01)
G06Q 30/00 (2006.01)
(52) U.S. Cl. ........ 707/723; 707/772; 707/913; 705/27.2
(58) Field of Classification Search .......... 707/706–708, 707/722–723, 728, 731, 911, 948, 913–917; 705/26, 27, 27.2
See application file for complete search history.

(56) References Cited

U.S. PATENT DOCUMENTS

| 5,745,681 | A | 4/1998 | Levine et al. |
| 6,070,167 | A | 5/2000 | Qian et al. |
| 7,668,821 | B1* | 2/2010 | Donsbach et al. ............ 705/27 |
| 2002/0010625 | A1* | 1/2002 | Smith et al. ............ 705/14 |
| 2002/0103813 | A1* | 8/2002 | Frigon ............ 707/104.1 |
| 2003/0105682 | A1 | 6/2003 | Dicker et al. |
| 2004/0148366 | A1 | 7/2004 | Ross, Jr. et al. |
| 2005/0009078 | A1 | 1/2005 | Craford et al. |
| 2005/0097007 | A1 | 5/2005 | Alger et al. |
| 2007/0005571 | A1* | 1/2007 | Brewer et al. ............ 707/3 |
| 2007/0078832 | A1* | 4/2007 | Ott et al. ............ 707/3 |
| 2007/0219964 | A1* | 9/2007 | Cannon et al. ............ 707/3 |
| 2007/0226077 | A1* | 9/2007 | Frank et al. ............ 705/27 |
| 2008/0021928 | A1* | 1/2008 | Yagnik ............ 707/104.1 |
| 2008/0065995 | A1* | 3/2008 | Bell et al. ............ 715/751 |
| 2008/0082426 | A1* | 4/2008 | Gokturk et al. ............ 705/27 |
| 2008/0082486 | A1* | 4/2008 | Lermant et al. ............ 707/3 |
| 2008/0091549 | A1* | 4/2008 | Chang et al. ............ 705/26 |
| 2008/0189336 | A1* | 8/2008 | Prihodko ............ 707/104.1 |
| 2008/0281684 | A1* | 11/2008 | Stefanik et al. ............ 705/14 |
| 2009/0077062 | A1* | 3/2009 | Spivack et al. ............ 707/5 |

OTHER PUBLICATIONS

Mukherjea et al. "AMORE: A World Wide Web image retrieval engine" Baltzer World Wide Web [online]. vol. 2, No. 3. 1999 [retrieved on Sep. 11, 2010]. Retrieved from the Internet:<URL: http://www.springerlink.com/content/v257668q1jm0862h/fulltext.pdf> pp. 115-132.*

U.S. Appl. No. 12/200,822, filed Aug. 28, 2008, Agarwal, et al., "Enhancing and Storing Data for Recall and Use".

(Continued)

Primary Examiner — Robert Beausoliel, Jr.
Assistant Examiner — James E Richardson
(74) Attorney, Agent, or Firm — Lee & Hayes, PLLC

(57) ABSTRACT

Identification and Surfacing of related pieces of content, such as user-provided content, enables users of a merchant website to more easily find related items. A server associated with the website may receive, from a user, an image that illustrates items offered for sale on the site. The site may then enable this and other users to annotate the image by, for example, associating the illustrated items with hyperlinks to respective item detail pages. When a user views this page, the site may surface the most related other user-uploaded images that also illustrate items. To determine the most related images, the website may analyze, for each of the other images, the similarity between the items illustrated in the image and the items illustrated in the currently-displayed image. The website may also analyze the tags applied to the items and the images themselves, as well as multiple other types of criteria.

12 Claims, 11 Drawing Sheets

OTHER PUBLICATIONS

U.S. Appl. No. 12/203,634, filed Sep. 3, 2008, Gulten, et al., "Facilitating Review of Products Considered For Purchase".

U.S. Appl. No. 12/415,479, filed Mar. 31, 2009, Endresen, "Acquiring Multiple Items in an Image".

Blog at WordPress.com, "H&M Virtual Dressing Room", retrieved on Jun. 12, 2008, 2 pgs.

Dogma London Virtual Dressing Room, retrieved on Jun. 12, 2008 at <<http://www.dogmalondon.com/dressing.html>>, Dogma London, Inc., 2006, 2 pgs.

"H&M—Dressing Room", retrieved on Mar. 4, 2009 at <<http://www.hm.com/gb/inspiration/dressingroom_dressingroom2.nhtml>>H&M Hennes Ltd., Copyright H & M Hennes & Mauritz AB 2007, 1 pg.

KnickerPicker The Online Dressing Room, retrieved on Jun. 12, 2008 at <<http://www.knickerpicker.com/dressing-room.asp?results=27&Type=Brand&BNm=La%20Senza>>, KnickerPicker, Ltd., 2008, 1 pg.

My Virtual Model—Virtual Dressing Room, retrieved on Jun. 12, 2008 at <<http://www.mvm.com/en/solutions.htm>>, My Virtual Model Inc., (2001-2006), 4 pgs.

Score American Soccer Virtual Dressing Room, retrieved on Jun. 12, 2008 at <<http://www.scoresports.com/vdr.php>>, Score American Soccer Company, Inc., 2007-2008, 2 pgs.

U.S. Appl. No. 11/782,633, filed Jul. 24, 2007, Desjardins et al. "Customer-Annotated Catalog Pages.".

"Facebook Photos Infrastructure", The Facebook Blog, retrieved on Jul. 11, 2011 at <<http://blog.facebook.com/blog.php?post=2406207130>>, 2 pages.

"How to tag photos in Facebook", eHow.com, retrieved on Jul. 11, 2011 at <<http://www.ehow.com/how_4816174_tag-photos-facebook.html>>, 2 pages.

Office action for U.S. Appl. No. 12/415,479, mailed on Jun. 24, 2011, Endresen, "Acquiring Multiple Items in an Image", 18 pages.

Non-Final Office Action for U.S. Appl. No. 11/782,633, mailed on May 13, 2011, Chad Desjardins, "Customer Catalogs-Annotated Guides".

Business/Technology Editors, Business Wire. "Introducing I ShopHere—The World's Fastest and Easiest Way To Shop Online", retrieved on Aug. 3, 2011 at http://proquest.umi.com/pqdweb?did=42217221&sid=9&Fmt=3&clientId=19649&RQT=309&VName=PQD, Business Wire, Jun. 8, 1999, 5 pages.

Final Office Action for U.S. Appl. No. 12/415,479, mailed on Jan. 23, 2012, Endresen, "Acquiring Multiple Items in an Image", 10 pages.

* cited by examiner

US 8,296,291 B1

SURFACING RELATED USER-PROVIDED CONTENT

RELATED APPLICATION

This application is related to U.S. patent application Ser. No. 11/782,633, filed Jul. 24, 2007, entitled "Customer-Annotated Catalog Pages", which is hereby incorporated in its entirety by reference.

BACKGROUND

Unlike traditional brick-and-mortar businesses, companies utilizing e-commerce websites often do not have a physical store or location where a salesperson can help both novice and knowledgeable customers find sought-after products. Instead, a customer navigating an e-commerce website typically attempts to identify a product that meets the customer's needs. Even a customer with considerable experience navigating e-commerce websites sometimes experiences difficulty in locating a desired product from among hundreds or thousands of offered products. For novice customers, meanwhile, the task of shopping online via the web can be unproductive and even frustrating.

In response to these difficulties, these companies continually strive to make their e-commerce websites more dynamic, compelling, and easier for users to navigate and locate products. To help meet these goals, these companies endeavor to not only simplify a customer's experience in locating a particular product, but also endeavor to simplify a customer's experience in locating relating products. For instance, if a topic of "fitness" interests a particular customer, then an e-commerce company typically desires to display to the particular customer a variety of related products that relate to this topic.

While some recent innovations have proven very successful, e-commerce companies continue to explore techniques to enable customers to more easily locate related products.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
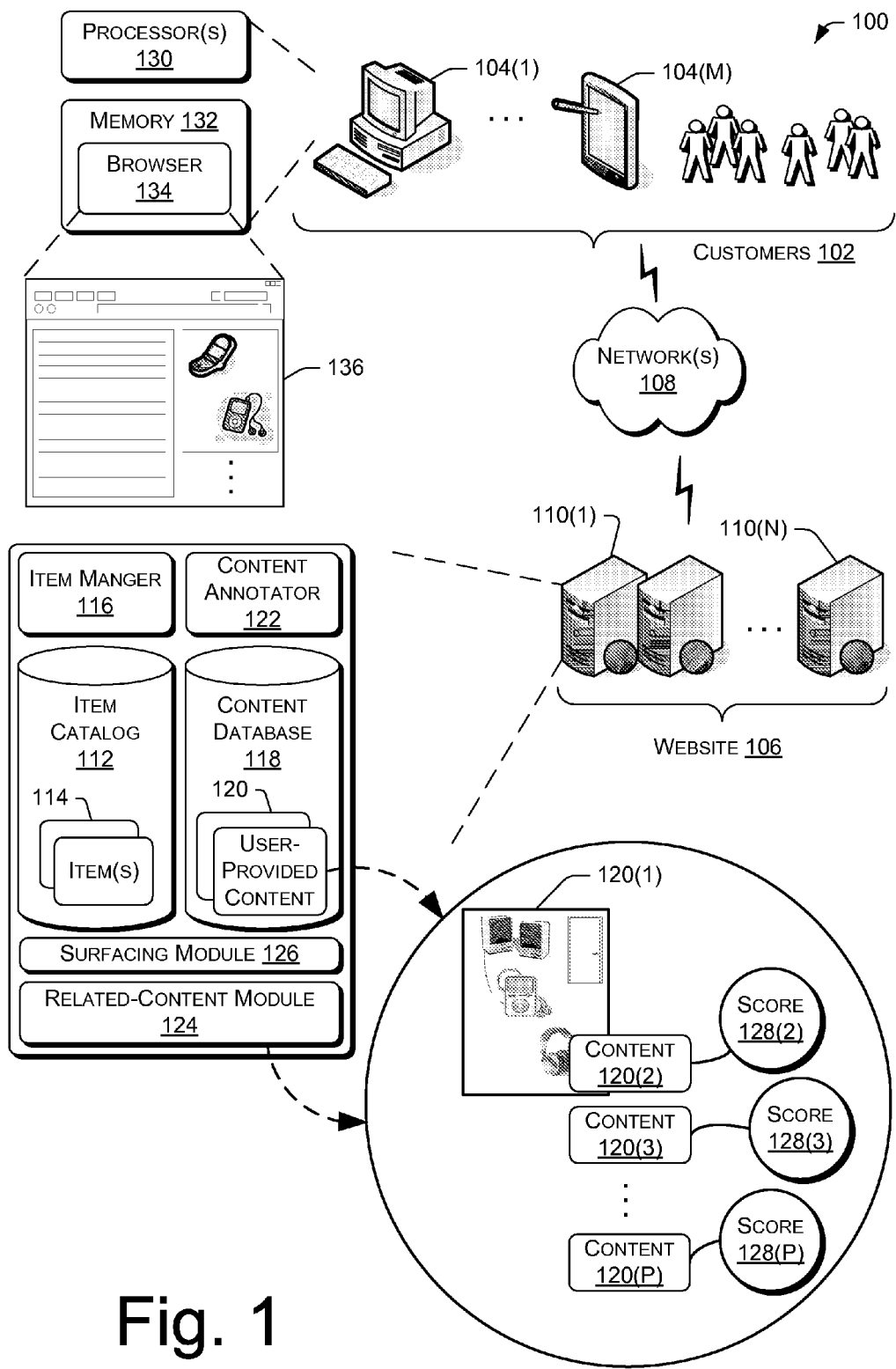
FIG. 1 depicts an illustrative architecture for identifying and surfacing related content, such as user-provided content. The architecture includes multiple clients coupled via a network to a server system that hosts an electronic catalog as well as user-provided content.

Embodiments of the present disclosure are directed to, among others, identifying and surfacing pieces of content that have been deemed related to another piece of content, such as a piece of user-provided content. Multiple techniques for identifying related content are described below. Once the techniques are employed and relatedness amongst content is determined, certain pieces of content may be surfaced and displayed to a user based on the relatedness.

Before discussing techniques for determining relatedness, a discussion of illustrative pieces of content upon which these techniques may be applied is provided. Pieces of user-provided content may be images, videos, animations, or any other type of file, as well as a combination thereof. These pieces of user-provided content may also reference or otherwise be associated with one or more elements in an electronic catalog. Elements may be a product, a service, a sellable unit, a user profile, customer-created content (e.g., artwork), or the like. In some instances, these pieces of content illustrate the elements and may be associated with hyperlinks to pages that are associated with the illustrated elements.

For instance, a piece of content may comprise an image (e.g., a JPEP photograph) that illustrates one or more items for sale on a merchant website. An area that approximately frames this item may be associated with a hyperlink to an item detail page corresponding to the item. Therefore, when a user selects (e.g., clicks on) this area, the website may serve the item detail page to a computing device of the selecting user.

A piece of content may also comprise a video file, wherein the video file references (e.g., visually or audibly) items, such as items for sale on a merchant website. The video file may be annotated such that each of the referenced items is associated with a particular time in the timeline of the video. For instance, when an item is shown in a video, details about the item may be displayed adjacent or within the video. A hyperlink may also be displayed, such that a user viewing the video may select the hyperlink, which may point to a page associated with the referenced item. Of course, while a few specific examples of user-provided content have been provided, multiple other types of content may similarly employ the techniques described herein.

In some instances, users may themselves annotate the pieces of user-provided content. As an overview, annotating may include commenting on the content, commenting on elements illustrated in the content, or associating hyperlinks to web pages associated with the illustrated elements, among other possibilities. With use of these annotations, a particular user may create a catalog page that is made available to other users over a network such as the Internet. These other users may then further annotate this catalog page or comment on the existing annotations. In addition to enabling further annotations, making this page available over the network enables these other users to view potentially-related elements that together appear in the content.

In some instances, a user uploads to a website a piece of content such as an image that illustrates one or more elements. In other instances, an operator of the website provides the image. The user, another user of the website, the website operator, or some other entity then describes the scene that the image generally illustrates. In addition, one or more of these actors describe or comment upon an element within the image. In instances where the image contains an element listed in an electronic catalog, one or more of these actors associate the illustrated element with a link to a page that is associated with the element in the electronic catalog. Therefore, the image may display this link or some other metadata relating to the element when a user's cursor hovers over the illustrated element in the image. If the user selects (e.g., clicks on) the element or the displayed link, then the website serves a webpage that corresponds to the page associated with the element. If the image illustrates multiple elements within the electronic catalog, then each of these elements may be similarly associated with a link to a respective page that is associated with a respective element in the electronic catalog.

For a given piece of user-provided content, such as an image or video as described above, a degree of relatedness may be determined between this piece of content and each of multiple other pieces of content. Some or all of these other pieces of content may then be surfaced and displayed to users in a manner based at least in part on the determined degrees of relatedness. For instance, the "best" or "most related" pieces of content may be displayed on a page that is associated with the given piece of content. These displayed pieces of content may be of the same or different type as the given piece of content. For instance, while the given piece of content may be an image, the related displayed pieces of content may comprise images, videos, and/or any other types of user-provided content.

To determine a degree of relatedness, multiple factors may be analyzed. For instance, elements that the given piece of content illustrates may be compared with elements that the other pieces of content illustrate. The pieces of content that illustrate a large number of elements that the given piece of content illustrates may be deemed more related than those pieces of content that illustrate a fewer number. This factor may take into account both a total number of common elements as well as a ratio of common elements to total elements. In addition to determining common elements, relatedness may also be based on strength of similarity between non-matching elements. In these instances, a higher strength of similarity between illustrated elements corresponds to a higher degree of relatedness.

Degrees of relatedness may also be based on tags that have been applied to the pieces of content as well as the elements that the pieces of content illustrate. For instance, pieces of content that have themselves been associated many of the same tags as the tags applied to the given piece of content will be deemed more related than pieces of content that have been associated with fewer of those same tags. The same may be true for the illustrated elements. That is, those pieces of content having elements that have been associated with many of the same tags as the elements illustrated by the given piece of content will be deemed more related than pieces of content that do not contain elements having been associated with those tags. Similar analysis may be applied to tags that are related to tags having been associated with the given piece of content or the elements that the given piece of content illustrates.

In addition to element and tag similarity, relatedness between pieces of content may also be based, in whole or in part, on multiple other factors. These factors may include a sales rank of the illustrated elements, a conversion rate of the pieces of content, user feedback on the pieces of content, reputation of the users providing the feedback, a reputation of a user who provided or annotated the content, prices of illustrated elements, brands or categories of illustrated elements, and the like.

For purposes of discussion, techniques for identifying and surfacing related content are described in the context of an item catalog hosted by a merchant website. One illustrative implementation of this environment is provided below. However, it should be appreciated that the described techniques may be implemented in multiple other environments.

Illustrative System Architecture

FIG. 1 illustrates an illustrative architecture 100 in which identification and surfacing of related content may be implemented. In architecture 100, one or more customers 102 utilize computing devices 104(1), . . . , (M) to access a website 106 via a network 108. Network 108 represents any one or a combination of multiple different types of networks, such as cable networks, the Internet, and wireless networks.

One or more servers 110(1), . . . , 110(N), perhaps arranged in a cluster or as a server farm, host website 106. Other server architectures may also be used to host the site. Website 106 is capable of handling requests from many users and serving, in response, various web pages that can be rendered at user computing devices 104(1)-(M). Website 106 can be any type of website that supports user interaction, including online retailers, informational sites, social networking sites, blog sites, search engine sites, news and entertainment sites, and so forth.

In the illustrative environment, website 106 represents a merchant website that hosts an electronic catalog with one or more items. An item includes anything that the merchant wishes to offer for purchase, rental, subscription, viewing, informative purposes or some other form of consumption. In some embodiments the item may be offered for consumption by the merchant. However, in some embodiments the merchant may host items that others are selling using the merchant's website. An item can include a product, a service, a digital download, a news clip, customer-created content (e.g., a customer review), information, or some other type of sellable or non-sellable unit.

In FIG. 1, the electronic catalog is represented as an item catalog 112, which stores a collection of item records 114. Item catalog 112 is accessible, directly or indirectly, by one or more of servers 110(1)-(N). Each item record 114, meanwhile, represents an associated item, which may be offered for sale (or some other four of consumption) on website 106, and contains information about the associated item. For products such as books or music CDs, for example, the item record may contain a description, images of the product, author/ artist names, publication data, pricing, shipping information, and so forth. For other types of items, the item record may contain different information appropriate for those items.

An item manager 116 facilitates access to and management of item records 114 in item catalog 112. Item manager 116 allows the website operators to add or remove items to item catalog 112, and generally maintain control of the items offered on website 106. When a user requests information on an item from website 106, one or more of servers 110(1)-(N) retrieve the item information from item catalog 112 and serve a web page containing the information to the requesting user computing device. Item catalog 112 may therefore contain static web pages that are pre-generated and stored prior to such requests, or may alternatively store data that is used to populate dynamic web pages that are generated in response to such requests.

In addition, each item record 114 within item catalog 112 may be associated with multiple pages, such as an item review page, an item detail page, and the like. The item detail page displays metadata about the particular item and stored within items records 114. This metadata may include the item's name, manufacturer, specifications, price, availability, and the like. Imagine, for instance, that one of customers 102 searches item catalog 112 for a particular item via a search tool. Website 106 would serve, to one of computing devices 104(1)-(M), a webpage that lists items that match the search criteria. If the customer selects (e.g., clicks on) one of the returned items, then website 106 likely serves the item's item detail page to the computing device.

Web servers 110(1)-(N) also include and/or can access a content database 118, which here includes one or more pieces of user-provided content 120. Content database 118 may also include pieces of content that have not been provided by a user of website 106, but instead have been provided by an operator of website 106 or otherwise. As illustrated, web servers 110(1)-(N) also include a content annotator 122 to enable customers 102, an operator of website 106, or some other entity to create and/or annotate user-provided content 120, as well as potentially other types of content.

In some instances, user-provided content 120 includes one or more customer catalog pages. These customer catalog pages (or other types of user-provided content) may comprise a webpage, document, a video, or any other file or media file that is configured to visually, audibly or otherwise represent one or more of items 114. For instance, these catalog pages may include an image that one of customers 102 uploaded onto web servers 110(1)-(N). This image may be a digital photograph taken by the customer, an image taken off of the Web, an animation, or any other type of file capable of being rendered on one or more of catalog pages 120. This image may thus comprise any suitable file format, such as JPEG, PDF, HTML, or the like. Conversely, an operator of Website 106, a distributor or manufacturer of an item, or some other entity may instead provide this image.

Whatever its source, this image may include annotations about the image or the item(s) illustrated in the image. For instance, one of customers 102 may employ content annotator 122 to describe an image included as a part of a catalog page. If, for instance, the image comprises a digital photograph of one of customers 102 in her running gear, this customer may describe the image as "My Favorite Running Outfit". This customer may also describe benefits of the outfit or may express any other personal message. In addition, this customer may associate an item illustrated in the image (e.g., her running shoes) with a hyperlink to a page associated with the running shoes within item catalog 112, such as an item detail page for the shoes. This hyperlink may also correspond to a page hosted by a website other than website 106. This customer may similarly associate other items illustrated in the image with hyperlinks to the respective items within item catalog 112 or with hyperlinks to pages associated with the items and hosted by other websites.

Additionally, other customers, the website operator, or some other entity may annotate this image. For instance, one of customers 102 may associate an illustrated workout shirt with a hyperlink to a page associated with the shirt within item catalog 112, such as an item detail page or item review page. This customer could also comment on her experience with the workout shirt and/or the running shoes, or could provide a link to an address containing comments she has previously made about the items. This customer, the author of the page, the website operator, or some other entity may also suggest items to serve as alternatives to the illustrated items. In some instances, a hyperlink to the alternative items may be provided as a part of the catalog page.

FIG. 1 also illustrates that servers 110(1)-(N) include are have access to a related-content module 124. Related-content module 124 functions to determine relatedness between each of pieces content 120 within content database 118. With use of this information, a surfacing module 126 may display pieces of content of content that are related to a given piece of content. For instance, if one of customers 102 views a webpage associated with a particular customer catalog page, surfacing module 126 may display the pieces of content that are deemed most related to that particular catalog page.

FIG. 1 illustrates that content 120 may include a customer catalog page 120(1), as well as multiple other pieces of content 120(2), (3), . . . , (P). In the illustrated example, related-content module 124 has determined a relatedness between each of pieces of content 120(2)-(P) and customer catalog page 120(1). Based on the determined relatedness, related-content module 124 has also assigned similarity scores 128(2), (3), . . . , (P) to pieces of content 120(2)-(P), respectively. Therefore, piece of content 120(2) has a corresponding similarity score 128(2) when compared with customer catalog page 120(1). As discussed in detail below, surfacing module 126 may then display the pieces of content having the highest similarity scores on a page associated with customer catalog page 120(1), such as on customer catalog page 120(1) itself. Surfacing module 126 could also surface pieces of content in any other manner based on scores 128(2)-(P).

Once a catalog page has been created and/or uploaded, customers 102 may utilize user computing devices 104(1)-(M) (also referred to as "client computers" or simply "clients") to view the created page, as well as the related pieces of content displayed by surfacing module 126. User computing devices 104(1)-(M) may be implemented as any number of computing devices, including as a personal computer, a laptop computer, a portable digital assistant (PDA), a mobile phone, a set-top box, a game console, and so forth. As illustrated, each user computing device is equipped with one or more processors 130 and memory 132 to store applications and data. According to some embodiments, a browser application 134 is shown stored in memory 132 and executes on processor(s) 130 to provide access to website 106. Browser 134 renders web pages served by website 106 on an associated display. Although embodiments are described in the context of a web based system, other types of client/server based communications and associated application logic could be used. In addition, note that software applications other than a browser may similarly be employed. When one of customers 102 accesses website 106, user computing device 104(1) submits a request to servers 110(1)-(N). Upon receiving the request, servers 110(1)-(N) return a web page 136 back to the requesting client computer. Here, web page 136 represents an illustrative customer catalog page that includes surfaced related content, shown in detail in FIG. 6. Computing device 104(1) may receive web page 136 in a number of ways. First, this customer may merely enter a uniform resource locator (URL) address into a browser toolbar or the like. Conversely, website 106 may include a catalog search page, from which the customer may search for a particular topic (e.g., "running"). If included in the search results, the customer may then select a link or an icon representing web page 136.

Illustrative Customer Catalog pages and Surfaced Related Content

Figure 2:
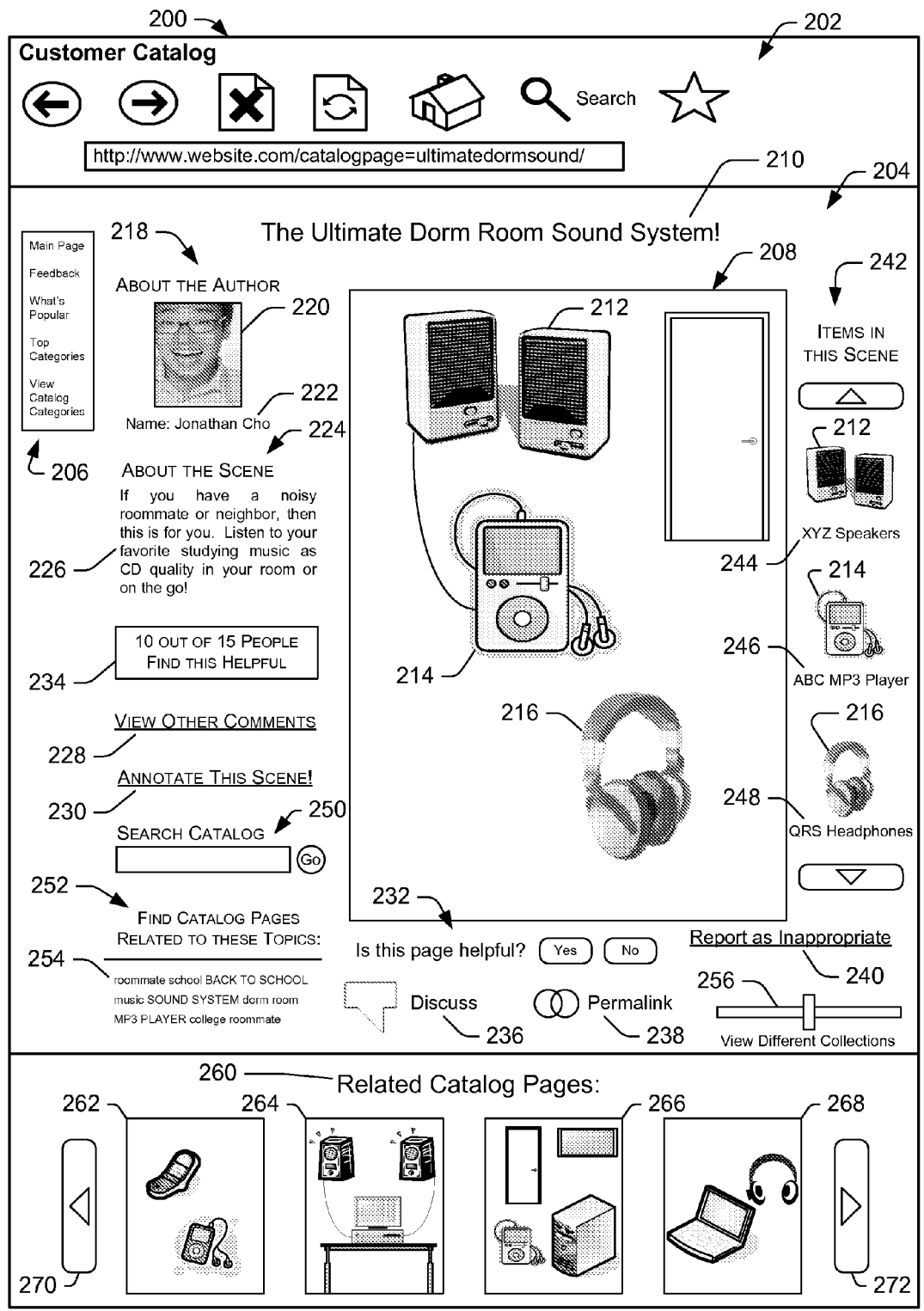
FIG. 2 depicts a screen rendering of an illustrative type of user-provided content from FIG. 1, as well as content that has been deemed related to this content. Here, the content comprises customer-annotated catalog pages. Some or all of these catalog pages include an image that illustrates multiple items found within an electronic catalog.

FIG. 2 represents an illustrative customer catalog page 200, on which related pieces of user-provided content (e.g., other customer catalog pages) may be illustrated or referenced. Before describing the illustrated related pieces of user-provided content, a discussion of other possible characteristics page 200 is provided.

Customer catalog page 200 includes a browser toolbar 202 and a content area 204. Browser toolbar 202 enables a user of the merchant website to navigate to a customer catalog page such as page 200. Content area 204, meanwhile, includes a menu 206, an image 208, and a title 210. Menu 206 includes multiple links to web pages hosted and served by the merchant website. Image 208, meanwhile, may comprise many of the characteristics described above in regards to catalog page 120(1). Image 208, for instance, here comprises a digital photograph that has been uploaded by a user (e.g., one of customers 102) of the merchant website. Note that in some instances, image 208 is a single image. That is, image 208 is a standalone file which may illustrate multiple items within item catalog 112. Likely inspired by image 208, the user (i.e., the "author" of the page) has entitled customer catalog page 200 "The Ultimate Dorm Room Sound System!" While FIG. 2 illustrates an image, other customer catalog pages may comprise other types of files, as discussed above.

Here, image 208 includes three items included within an electronic catalog such as item catalog 112. As illustrated, this image includes speakers 212, an MP3 player 214, and a set of headphones 216. Because this image comprises a digital photograph, the image also illustrates a door to the user's dorm room and may also illustrate other articles or scenery that a typical photograph would illustrate. In addition to illustrating the three items 212-216, customers 102 of the merchant website, an operator of the merchant website, and/or some other entity may associate one or more of these items to their respective item detail pages within item catalog 112. For instance, speakers 212 may be associated with a page that is associated with speakers 212. This associated page may include, for instance, an item detail page for speakers 212, an item review page for speakers 212, a page hosted by another website that includes speakers 212, or any other page that pertains to these speakers.

Figure 3:
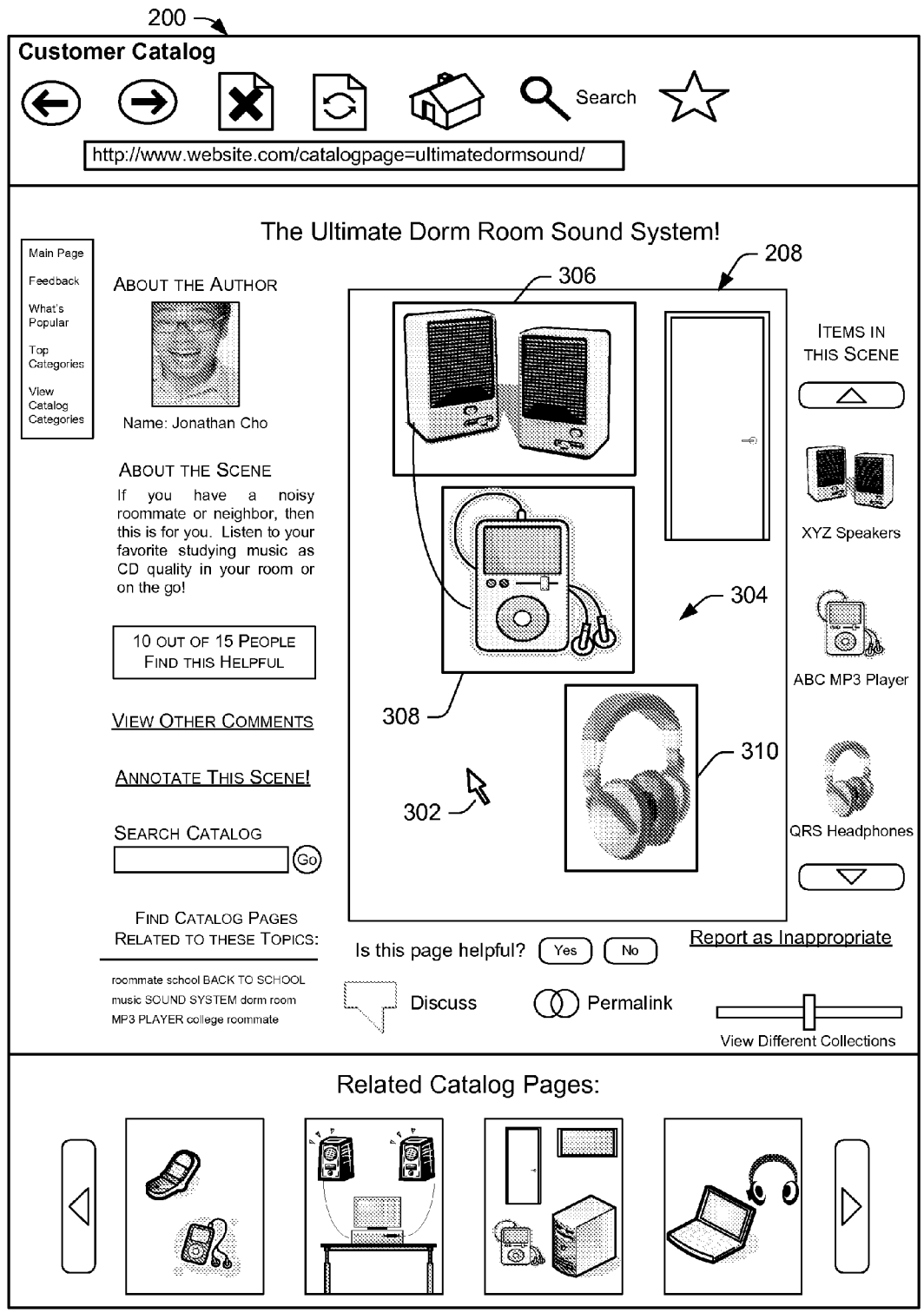
FIG. 3 illustrates a screen rendering of the highlighted illustrative customer-annotated catalog page of FIG. 2 at a time when a cursor is hovering over the image. As shown, the catalog page identifies illustrated items responsive to the hovering cursor.
Figure 4:
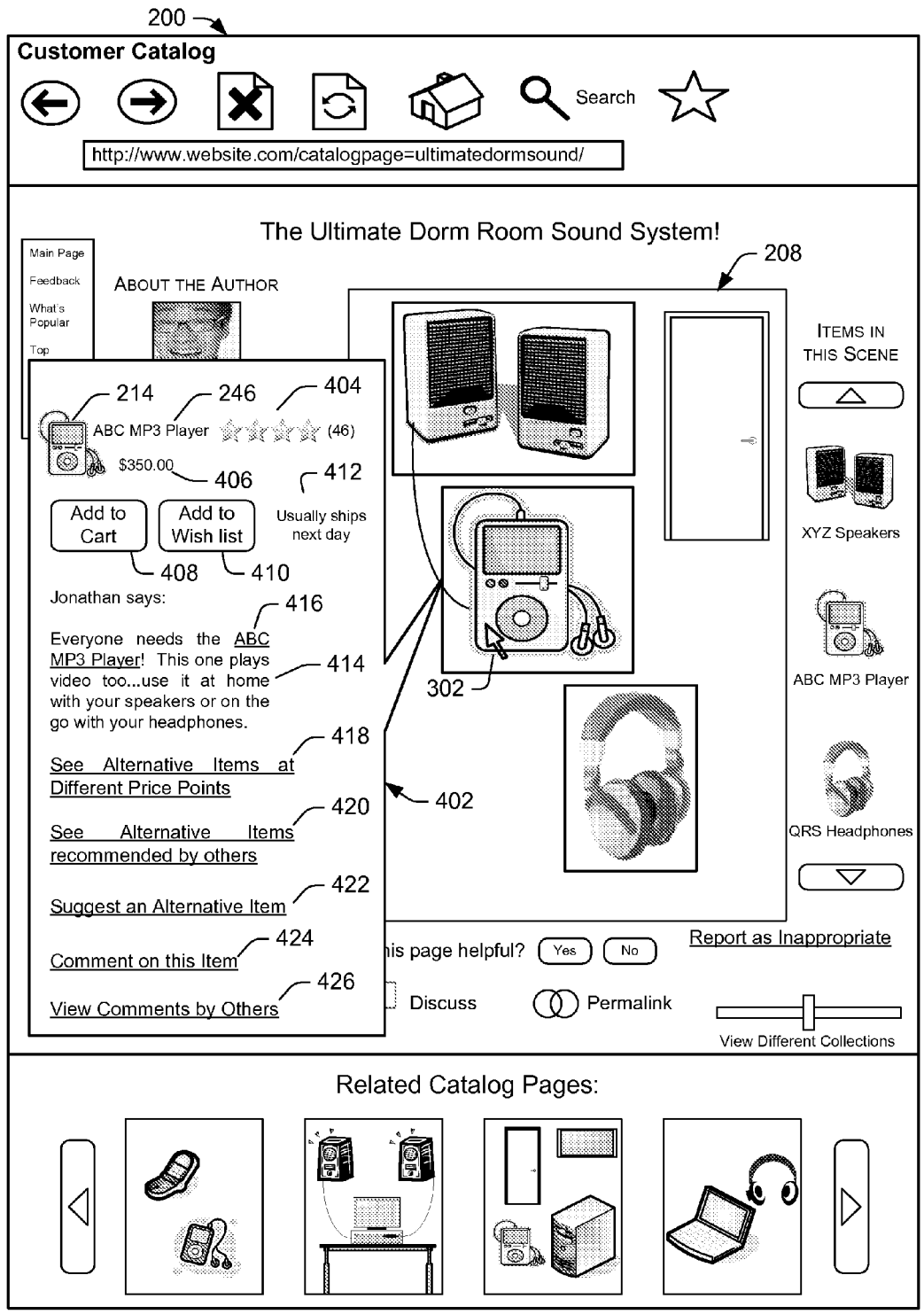
FIG. 4 illustrates a screen rendering of the highlighted illustrative customer-annotated catalog page of FIG. 2 at a time when a cursor is hovering over a particular item illustrated in the image. Here, the catalog page illustrates metadata about the particular item responsive to the hovering cursor.

In the illustrated implementations, the associated page is an item detail page for speakers 212. Therefore, when a user rolls a cursor over the speakers, a link (e.g., a hyperlink) to the corresponding item detail page may appear. Alternatively or additionally, if a user selects (e.g., clicks on) speakers 212 within image 208, the item detail page may be served to the user's computing device. FIGS. 3-4 describe this association in greater detail.

Content area 204 also includes information 218 "About the Author" of catalog page 200. This author may comprise the user who uploaded image 208, the user who first annotated image 208, the user who last annotated image 208, or some other individual or entity. In instances where multiple users annotate the image, catalog page 200 may include multiple authors, some or all of which may be recognized by information 218. In the illustrate embodiment, the user who uploaded image 208 is the author. Here, the author consists of the user who initially uploaded and annotated image 208 (i.e., the user that "created" customer catalog page 200).

As illustrated, information 218 includes a picture 220 representing the author. Picture 220 may alternatively or additionally comprise an icon or other symbol representing or chosen by the author. Information 218 also includes an author's name 222, which may comprise a legal name, screen name, and/or some other identifier. Here, the author's name is shown to be "Jonathan Cho".

Image 208 also includes information 224 "About the Scene". Information 224 may include a description 226 of image 208, or may include any other personal message chosen by the author, one or more other users, the website operator, and/or some other entity. Here, the author entered description 226, which states the following: "If you have a noisy roommate or neighbor, then this is for you. Listen to your favorite studying music as CD quality in your room or on the go!" In addition, the author may associate the catalog page 200 with a set of tags (e.g., "sound system", "dorm room", etc.).

Catalog page 200 thus enables a user of a merchant website to upload and annotate an image or annotate an existing image. This user entitles and describes the scene, and may also associate links (e.g., hyperlinks) to pages associated with the illustrated items. Additionally, other users or the website operator may also annotate image 208, as discussed immediately below.

In addition to providing description 226 entered in by the author of page 200, content area 204 includes an area 228 that enables users such as customers 102 to "View Other Comments" about image 208 and/or illustrated items 212-216. Here, area 228 comprises a link that, when selected, shows one or more comments about the image and/or items, possibly made by one or more of customers 102. In other instances, however, area 228 may list the comments themselves within content area 204 (e.g., in an order determined by the date that each comment was posted).

Additionally, content area 204 includes an area 230 that enables users such as customers 102 to "Annotate this Scene!" That is, selection of area 230 allows a user of the merchant website to annotate image 208. This user may choose to describe her previous experience with one of the items (e.g., MP3 player 214), or may choose to associate one of the items (e.g., MP3 player 214) with a link to a page such as an item detail page for that particular item. While FIG. 2 illustrates area 230 as a link, in other instances this area may comprise a text box in which a user may enter and post comments.

In some embodiments, the merchant website may employ certain barriers to entry before allowing users or other entities to annotate images such as image 208. For instance, the merchant website may require that a user has not previously been cited for inappropriately annotating images (e.g., once or a threshold number of times). The merchant website may alternatively or additionally require that a user have purchased an item generally from the merchant website or may require that the user have purchased the item for which the user wishes to annotate.

As illustrated, content area 204 further includes an area 232 to allow a user to voice her opinion on the helpfulness of catalog page 200. Here, area 232 comprises the question of "Is this Page Helpful?", and includes a "Yes" and "No" icon that the user may select in response to the question. Content area 204 also includes a results section 234 indicating the number of users that have found catalog page 200 helpful. Here, ten of fifteen users have found this page helpful. In some instances, the merchant website may take down catalog page 200 or may take other action responsive to receiving a certain percentage or threshold of "No" votes.

Additionally, content area 204 or another web page may track and display a number of times that users have visited catalog page 200 and/or selected or purchased items illustrated in image 208. In some instances, this tracking enables generated revenue to be shared amongst the merchant website and another individual or entity. For instance, if a user purchases an item after selecting the item from image 208, the merchant website may share a portion of the generated revenue with the author of the page. If a third party (e.g., one of customers 102) annotated image 208 to include a link to the item detail page, meanwhile, then that third party may additionally or alternatively share in this portion of the revenue. Finally, imagine that the link leads to a webpage that is not controlled by the merchant website but rather by a third party seller. Here, if a purchase is made, then the third party seller may agree to share generated revenue with the merchant website in exchange for the merchant website enabling the annotated link on image 208.

Catalog page 200 also includes a discussion link 236 that, when selected, allows the viewing user to navigate to a chat room or the like to discuss catalog page 200 as well as potentially other features of the merchant website. Catalog page 200 also includes a permalink 238 that enables the viewing user to bookmark catalog page 200 in the page's current state.

A link 240 to report the catalog page as inappropriate resides near permalink 238 in the illustrated embodiment. A viewing user may decide to select this link for a variety of reasons, such as if image 208 contains disagreeable content (e.g., violent images) or if an incorrect link has been associated with an illustrated item. For instance, imagine that a particular company ("ABC") markets and sells MP3 player 214. Imagine also that a user associates, with MP3 player 214, a link that corresponds to an item marketed by a competitor of the ABC company. Here, a user that views catalog page 200 may select link 240 to report this inappropriate association. Responsive to receiving this selection (or a threshold number of selections), the merchant website may take down catalog page 200, may investigate annotations within the page, or may take other investigative or remedial action.

As illustrated, content area 204 also includes a list 242 of those items that image 208 illustrates and that have been associated with a link to a respective associated page, such as an item detail page. Here, each of items 212-216 has been associated with a link to a respective item detail pages within item catalog 112. List 242, therefore, depicts each of items 212-216, and also includes a name 244, 246, and 248 for each item. Here, each of names 244-248 specify the item as well as a brand name under which the item is sold. Although list 242 depicts illustrations and names of items 212-216, other embodiments of catalog page 200 may instead list one or the other, or may exclude list 242 altogether.

Content area 204 may also include an icon entitled "Buy it All!" or the like. When selected, this icon enables the user to purchase each item within list 242. Content area 204 may accordingly also illustrate a total price of the collection. That is, content area 204 may illustrate the total cost associated with purchasing the collection of items within list 242. In some instances, this total cost may include a discount when compared with purchasing each of the items individually.

Content area 204 may also include an icon entitled "See Alternative Collections at Different Price Points". When this icon is selected, another list similar to list 242 may appear with items to serve as alternatives to items 212-216. Selection of this icon may also cause the display of other customer catalog pages that have been uploaded by customers 102 and that have been deemed as alternatives for the illustrated page 200. In some instances, these alternative pages may be deemed "less expensive" than the illustrated page, "more fashionable" than the illustrated page, or the like. These alternative pages may also be deemed as illustrating items of a particular brand or from a particular item category.

Finally, content area 204 may illustrate a price slider 256 for the collection of illustrated items. When slid to the left, for instance, content area 204 may illustrate less expensive collections, while content area 204 may illustrate more expensive collections when a user slides the slider to the right. For instance, one of the "less expensive" customer catalog pages may be illustrated if the slider is moved to the left, and vice versa. Similar sliders may exist based on style, brand, or any other category.

Price slider 256 may also include multiple sub-sliders that relate to each item within list 242. For instance, a user may slide a sub-slider corresponding to speakers 212 to the right if the user wishes to view high-end speakers. Conversely, the user may not place as much value in headphones. The user may accordingly slide this sub-slider more to the left. As such, when the user slides the collection price slider left and/or right, content area 204 will illustrate different collections at different price points, while at the same time taking into account the user's preference for higher-end speakers and lower-end headphones. Users, the website operator, or another entity may choose alternative items to illustrate in response to a user altering price slider 256 and/or another sub-slider. These alternative items may be determined by looking to the specifications or other characteristics (e.g., brand, color, model, etc.) of the illustrated items and choosing items with similar or the same specifications and/or characteristics. Of course, items having differing specifications may also be included as alternatives. While price sliders have been discussed, other mechanisms may also be employed and are similarly envisioned to enable the user to view alternative but similar item collections at differing price points or the like. Finally, note that if the catalog page illustrates a total price for the collection of items, this price may change as the user modifies the slider and/or sub-sliders.

Figure 6:
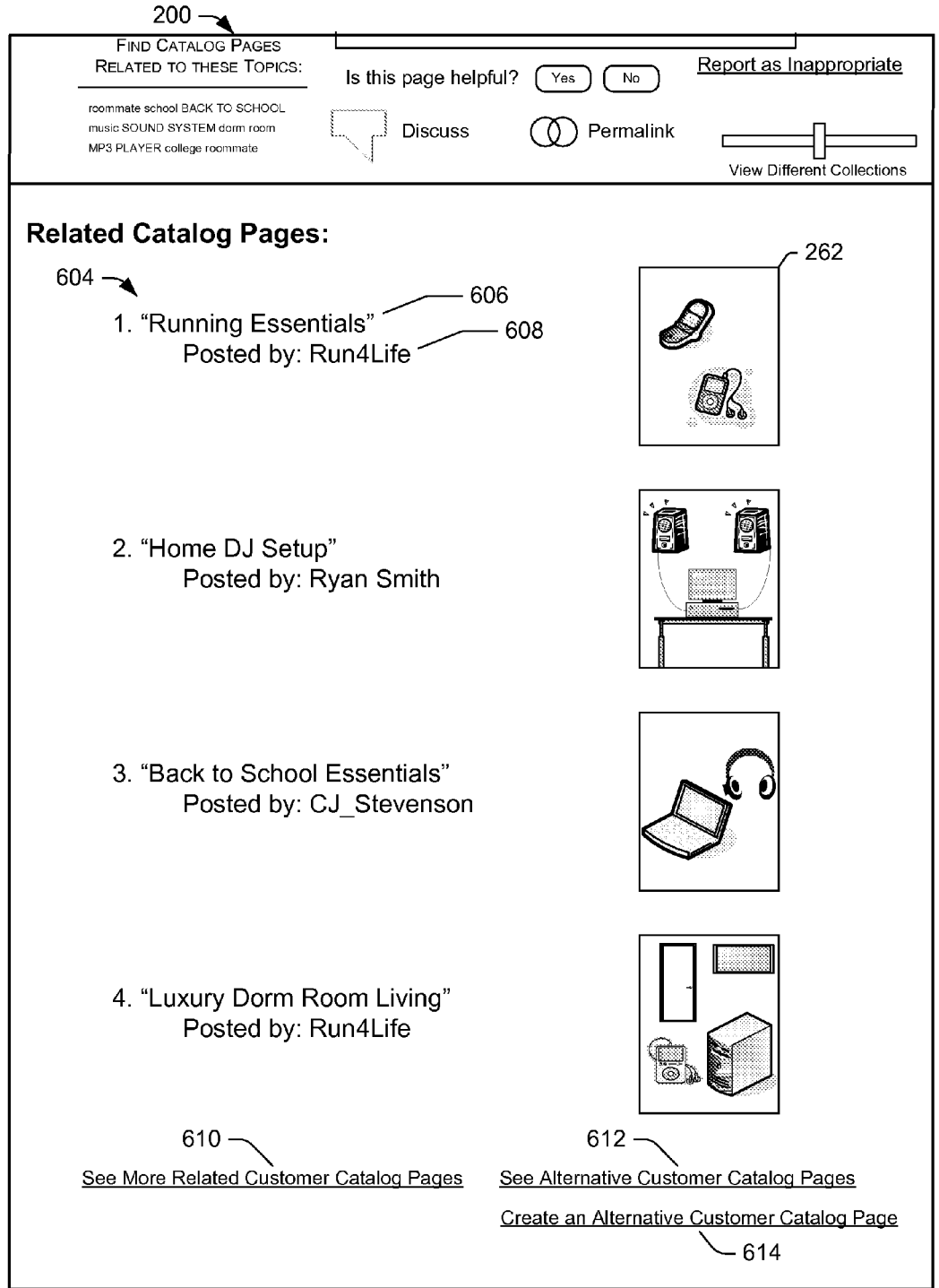
FIG. 6 illustrates a screen rendering of another illustrative page that includes catalog pages that have been deemed related to the catalog page highlighted in FIG. 2. Here, the related pages are displayed in a ranked order.

If a user wishes to search for catalog pages other than catalog page 200, meanwhile, content area 204 includes a search tool 250. Search tool 250 includes a text box that allows a user to enter a search term or phrase and search customer catalog 118. FIG. 6 illustrates example results of such a search, and is discussed in detail below. Content area 204 also includes an area 252 entitled "Find Catalog Pages Related to These Topics" to further simplify a user's navigation experience. Adjacent area 252 resides a list 254 of topics to which catalog page 200 relates. If, for instance, a user selects one of the topics from list 254 (e.g., "Sound System"), the merchant website will return a search results page listing catalog pages related to that topic.

Customer catalog page 200 also illustrates an area 258 that illustrates or otherwise references one or more other pieces of content (e.g., user-provided content or otherwise) that has been deemed related to customer catalog page 200. Here, area 258 illustrates other customer catalog pages that have been deemed most related to page 200. Area 258 thus includes a title 260 ("Related Catalog Pages"), as well as images 262, 264, 266 and 268 of corresponding customer catalog pages. Therefore, a user viewing customer catalog page 200 may choose to navigate to another customer catalog page by selecting (e.g., clicking on) one of images 262-268. Additionally, this user may choose to view more related pages by selecting one of arrows 270 and 272 to scroll left and right, respectively. The choice of which customer catalog pages to surface on page 200 made by website 106 is describe in detail below.

FIG. 3 illustrates catalog page 200 at a time when a cursor 302 hovers over image 208. A user such as one of customers 102 operating computing device 104(1) may operate cursor 302 via a point-and-select device such as a mouse, keyboard, rollerball, or the like. As illustrated, when cursor 302 hovers over image 208 a plurality of highlights 304 identify items within image 208 that have been annotated. For instance, a highlight 306 approximately borders speakers 212, while a highlight 308 borders MP3 player 214 and a highlight 310 borders headphones 216. While illustrated highlights 306-310 approximately border a respective one of items 212-216, in other embodiments these highlights may identify these items in other ways responsive to hovering cursor 302. In addition, while FIG. 3 illustrates that highlights 306-310 appear responsive to cursor 302 hovering over image 208 (and more specifically, a portion of the image that does not correspond to an illustrated item), in other embodiments these highlights may appear at other times. For instance, these highlights may appear at all times or when the user actually selects (e.g., clicks on) image 208.

As stated above, a highlight may identify an item that a user, website operator or other entity has annotated. That is, a highlight may identify those items that some individual or entity has described, commented on, or linked to an associated page such as a respective item detail page within item catalog 112. In some embodiments, highlights serve to identify items that have been associated with a link to associated pages within the item catalog or otherwise, but do not identify items that have only been commented upon.

FIG. 4, meanwhile, illustrates catalog page 200 at a time when cursor 302 hovers over a portion of image 208 that corresponds to an annotated item (here, MP3 player 214). Responsive to this hovering, catalog page 200 may depict a pop-up box 402 that illustrates metadata about the item. Again, while FIG. 4 illustrates pop-up box 402 as appearing when cursor 302 hovers over the item, catalog page 200 may similarly depict pop-up box 402 at other times. For instance, catalog page 200 may depict pop-up box 402 when the user selects the item with cursor 302, at all times, or when cursor 302 hovers over any part of the image. In the latter embodiments, catalog page 200 may thus illustrate a pop-up box for each of items 212-216 when cursor 302 hovers over image 208.

In the illustrated embodiment, pop-up box 402 includes metadata about MP3 player 214. In instances when the item has been associated with a corresponding link to, for example, an item detail page, catalog page 200 may pull and display metadata from the item detail page. Here, pop-up box 402 includes an illustration of MP3 player 214, name 246 of the player, and a rating 404 of the MP3 player. Rating 404 may comprise a community-generated rating or the like and is pulled into pop-up box 402 from the MP3 player's item detail page. Here, rating 404 shows that MP3 player 214 has received four stars and has been voted on by 46 users. In addition, pop-up box 402 illustrates a price 406 of MP3 player 214 on the merchant website. Again, catalog page 200 (and, more specifically, pop-up box 402) likely pulls this data from the player's item detail page. That is, catalog page 200 likely pulls this data from the item catalog, similar to how the item detail page pulls this information in response to receiving a request for the item detail page.

As FIG. 4 illustrates, pop-up box 402 also includes an icon 408 entitled "Add to Cart" and an icon 410 entitled "Add to Wish List". When selected, icon 408 places MP3 player 214 in an electronic shopping cart of the user. The user may then check out and purchase this and possibly additional items. When the user selects icon 410, meanwhile, the merchant website places MP3 player 214 on a wish list that the website maintains for the user. Pop-up box 402 additionally illustrates an availability indicator 412 corresponding to MP3 player 214. Here, availability indicator 412 states that the player "usually ships [the] next day".

As discussed above in regards to FIG. 2, catalog page 200 allows an author or other user to include information 224 "About the Scene" portrayed by image 208. Catalog page 200 similarly allows the author, another user, the website operator, or some other entity the ability to comment on a particular item such as MP3 player 214. Here, pop-up box 402 illustrates a description 414 as entered by Jonathan, the author of catalog page 200.

Description 414 not only includes a message about the player as provided by Jonathan, but also includes a hyperlink 416 ("ABC MP3 Player") to the item detail page corresponding to the player. Hyperlink 416 has thus been associated with MP3 player 214. As such, catalog page 200 allows a viewing user to navigate to the page, hover over MP3 player 214, view pop-up box 402, and select a hyperlink to the item detail page corresponding to the player. This user may also do the same for speakers 212 and headphones 216, which likely relate to the MP3 player as being components to the author's "Ultimate Dorm Room Sound System." Catalog page 200 thus furthers a goal of the merchant website to display, to users of the website, related items offered for sale in item catalog 112. In addition, pop-up box 402 (as well as similar pop-up boxes for items 212 and 216) enables the users to easily navigate to item detail pages for the related illustrated items.

In addition to illustrating potentially-related products within image 208, catalog page 200 also enables a user to view alternative items. Links 418 and 420, for instance, enable a user to view items to serve as an alternative to MP3 player 214. Link 418, here entitled "See Alternative Items at Different Price Points", comprises a hyperlink to alternative items generated by the merchant website. These alternative items may comprise items having similar characteristics of the illustrated items, but having different colors, brands, or the like. The merchant website (or other users) may not only suggest similar items having varying or similar prices than that of the illustrated item, but may also suggest newer models or the like. The merchant website may particularly wish to make such suggestions for alternative items when the illustrated item is out of stock, no longer available, on backorder, or the like.

In addition to link 418, pop-up box 402 may include a price slider similar to price slider 256. This price slider allows a user to slide a dial to the right or the left, for example, to view more expensive alternative items and less expensive alternative items, respectively. In some embodiments, pop-up box 402 illustrates these alternative items as the user slides the dial of the price slider. Again, these items may be determined with reference to specifications and/or characteristics of the items. For instance, imagine that a brand carries a less-expensive MP3 player with specifications (e.g., memory, functions, etc.) that are similar to MP3 player 214. This less-expensive MP3 player may be illustrated in response to a user moving the price slider to the left. Again, users, the website operator or some other entity may suggest these differently-priced items. Additionally, other sliders may also be included, such as sliders based on a product's fashion, brand, category, or any other objective or subjective characteristic.

Link 420, meanwhile, enables a viewing user to view alternative items suggested by other users such as customers 102 of the merchant website. Similarly, pop-up box 402 includes a link 422 entitled "Suggest an Alternative Item". When selected, link 422 allows the viewing user to navigate item catalog 112 to find an item to serve as an alternative to MP3 player 214. In addition or in the alternative to navigating item catalog 112, the viewing user may describe an alternative item or upload an image of an alternative item similar to image 208.

Finally, pop-up box 402 includes a link 424 that, when selected, allows a viewing user to annotate MP3 player 214 by "Comment[ing] on This Item". If, for instance, the viewing user owns MP3 player 214, this user may wish to share her experience with the player. Pop-up box 402 thus includes a link 426, entitled "View Comments by Others", to allow this user to view other user's comments. In other embodiments, meanwhile, pop-up box 402 illustrates some or all of these comments without requiring a viewing user to select link 426.

A user of the merchant website may navigate to catalog pages such as page 200 in multiple ways. First, customer catalog 118 may organize catalog pages 120 according to categories. The user then either peruses through a category (e.g., "Home and Garden") or searches within the category. In some instances, the user may view catalog pages within a category according to the "helpfulness" of each page as voted on by other users. Again, users of the website may create categories and/or may upload catalog pages into one or more categories to which the users believe the pages belong. Second, the user may search for catalog pages via search tool 250. Again, FIG. 6 illustrates illustrative results of such a search and is described below. Third, catalog pages containing a certain item may be identified within pages associated with that certain item, such as the item's item detail page or item review page. Catalog pages containing a related item may also be identified, in some instances, within this associated page such as the item detail page. Additionally, the user may select one of the related catalog pages, such as pages associated with images 262-268, surfaced on pages associated with another catalog pages, such as page 200.

Figure 5:
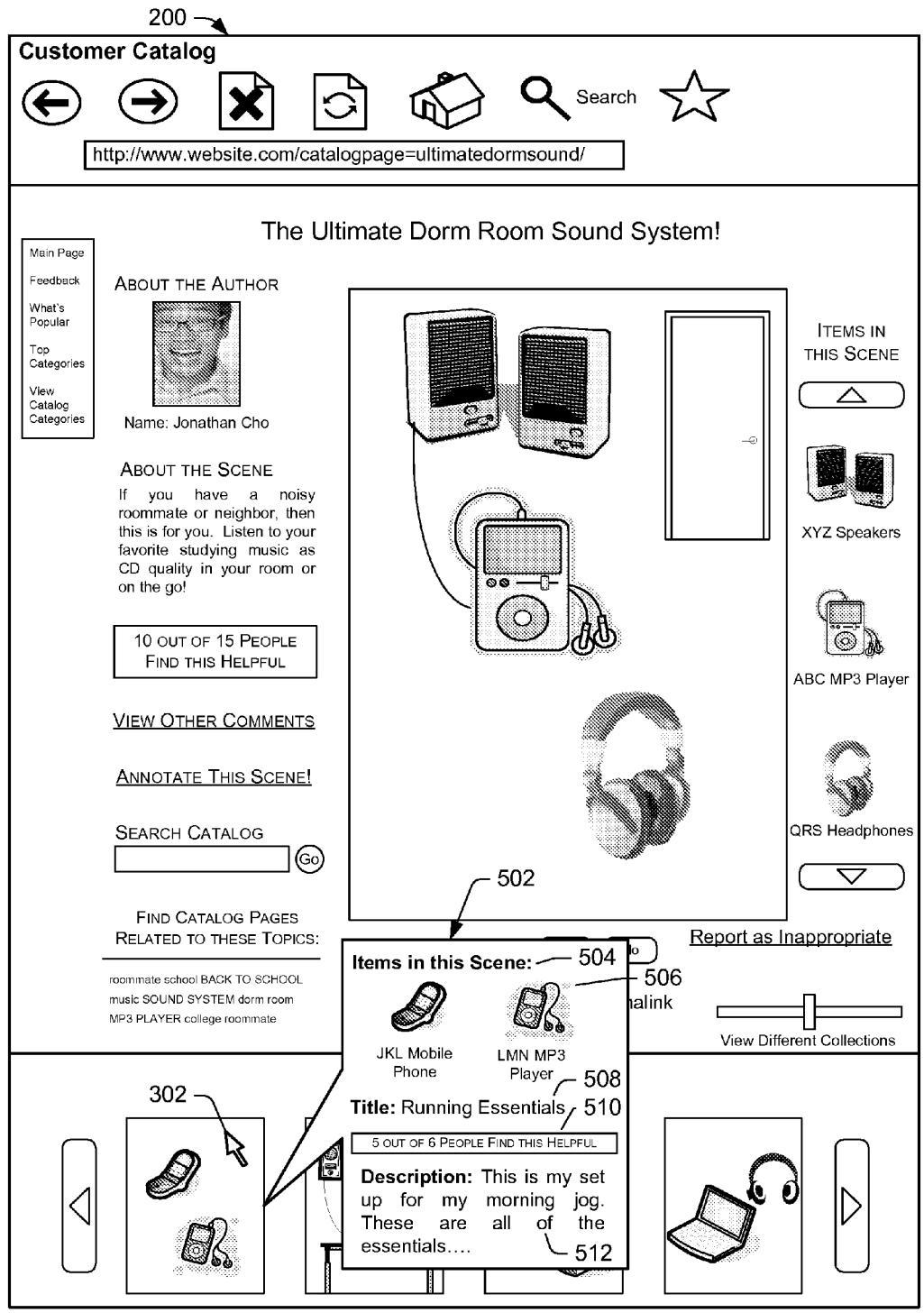
FIG. 5 illustrates a screen rendering of the highlighted illustrative customer-annotated catalog page of FIG. 2 at a time when the cursor hovers over a related customer-annotated catalog page. Here, the related catalog page illustrates metadata about the page responsive to the hovering cursor, such as information about the illustrated items.

FIG. 5 illustrates customer catalog page 200 at a time when cursor 302 hovers over image 262 corresponding to a catalog page that has been deemed related to page 200. As illustrated, page 200 illustrates a pop-up box 502 in response to the hovering of cursor 302. Similar to pop-up box 402, pop-up box 502 includes metadata about the catalog page corresponding to image 262. This information includes a listing 504 of the items illustrated in the particular catalog page, an illustration 506 of the items, a title 508 of the page, an indicator 510 of user-voted helpfulness of the page, and a description 512 of the page. In this implementation, if a user selects (e.g., clicks on) image 262, the customer catalog page associated with this image may be served to the user's computing device. Finally, and similar to pop-up box 402, other implementations of pop-up box 502 may include more or less information than the illustrated implementation.

Next, FIG. 6 illustrates another embodiment of customer catalog page 200. Here, page 200 again includes an area 602 that lists multiple pieces of content that have been deemed related to page 200. Here, however, area 602 includes a ranked list 604, which lists the related content in descending order according to similarity scores associated with each piece of the related content. That is, a piece of content that is deemed most related to customer catalog page 20 is listed first, with the next-most related piece of content listed next, and so on and so forth.

List 604 may include information identifying and/or describing the corresponding related piece of content, each of which here comprises a customer catalog page. Here, list 604 includes a title 606 ("Running Essentials") of the corresponding catalog page, as well as an author 608 of the page. Finally, the illustrated implementation includes an image, here image 262, corresponding to the related customer catalog page. Again, if a user viewing area 602 selects image 262 and/or title 606, website 106 may serve the corresponding customer catalog page to the display of the user's computing device.

Finally, area 602 is shown to include a link 610 entitled "See More Related Customer Catalog Pages", a link 612 entitled "See Alternative Customer Catalog Pages", and a link 614 entitled "Create an Alternative Customer Catalog Page". When a user selects link 610, website serves a page containing more catalog pages that have been deemed related to customer catalog pages 200.

When a user selects link 612, website 106 serves a page containing customer catalog pages that are deemed as "alternatives" to customer catalog page 200. As discussed above, these pages may display less expensive items, more expensive items, more fashionable items (e.g., as voted on by users), items of a particular brand or in a particular category, or the like. In some instances, area 602 includes corresponding links for each of these types of collections of alternative catalog pages. Finally, when a user selects link 614, website 106 may allow the selecting user to create an alternative customer catalog page. For instance, website 106 may allow the user to create a page that, according to the user, comprise less expensive items.

Figure 7:
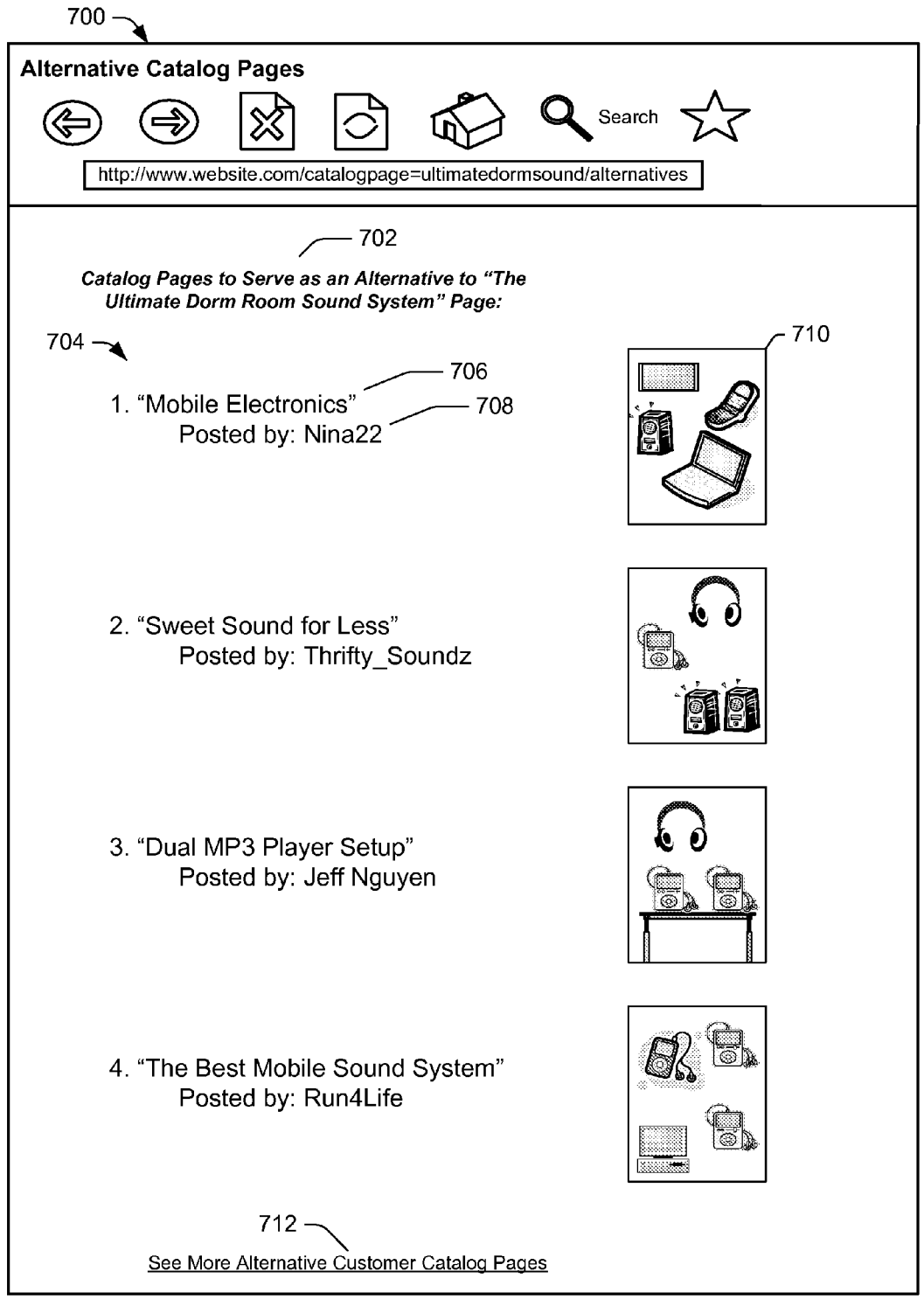
FIG. 7 illustrates a screen rendering of an illustrative page that includes catalog pages that have been deemed as "alternatives" to the catalog page highlighted in FIG. 2. Here, these alternative pages are again displayed in a ranked order.

FIG. 7 depicts an illustrative screen rendering of a page 700 that may be served responsive to a user selecting link 612. Page 700 includes a title 702 that indicates that the page contains "Catalog Pages to Serve as an Alternative to 'The Ultimate Dorm Room Sound System' Page" of FIG. 2. While page 700 illustrates alternatives generally, other implementations may illustrate customer catalog pages that serve as a particular type of alternative as discussed above (e.g., "Customer Catalog Pages that Contain a Less Expensive Collection of Items", or "Customer Catalog Pages that Contain a More Fashionable Collection of Items").

Page 700 also includes a ranked list 704 of the alternative customer catalog pages. Again, each entry includes a title 706 ("Mobile Electronics"), an author 708 ("Nina22"), and an image 710 of the corresponding customer catalog page. Finally, page 700 includes a link 712 that, when selected, renders a page that contains more alternative customer catalog pages.

While FIGS. 1-7 have been generally discussed with regard to a merchant website, multiple other environments may employ the described techniques. For instance, a social networking site may employ these techniques. Here, a user may upload a piece of content (e.g., an image or a video) that illustrates or otherwise references other users of the social networking site. For instance, the user may upload a photograph that illustrates multiple friends of the user. Each of the illustrated friends may then be associated with a link to a page associated with the respective friend, such as a profile page. Similar to the discussion of items above, an area that approximately frames the illustration of the friend may be associated with the link, and the same may be true for the other illustrated friends.

Additionally, related pieces of user-provided content, such as photographs, other images, or videos, may be determined for a referenced piece of content. In the instant example, for instance, a degree of relatedness between the uploaded photograph and other user-uploaded photographs may be determined. This degree of relatedness may be determined, for instance, by determining if the photographs illustrate some or all of the same people illustrated in the referenced photograph, if the photographs illustrate people that have been deemed to have similar interests as the people in the referenced photograph, if the photographs illustrate people who have similar friends as the people illustrated in the referenced photograph, if the photographs illustrate people who live near the people illustrated in the referenced photograph, and/or this relatedness determination may be based on multiple other factors (e.g., tags applied to the photographs, tags applied to people in the photographs, etc.). These other photographs may then be ranked according to their determined relatedness, and some or all may be displayed accordingly.

Again, while a few specific examples have been provided multiple other environments may make use of these techniques.

Illustrative Related-Content Module

Figure 8:
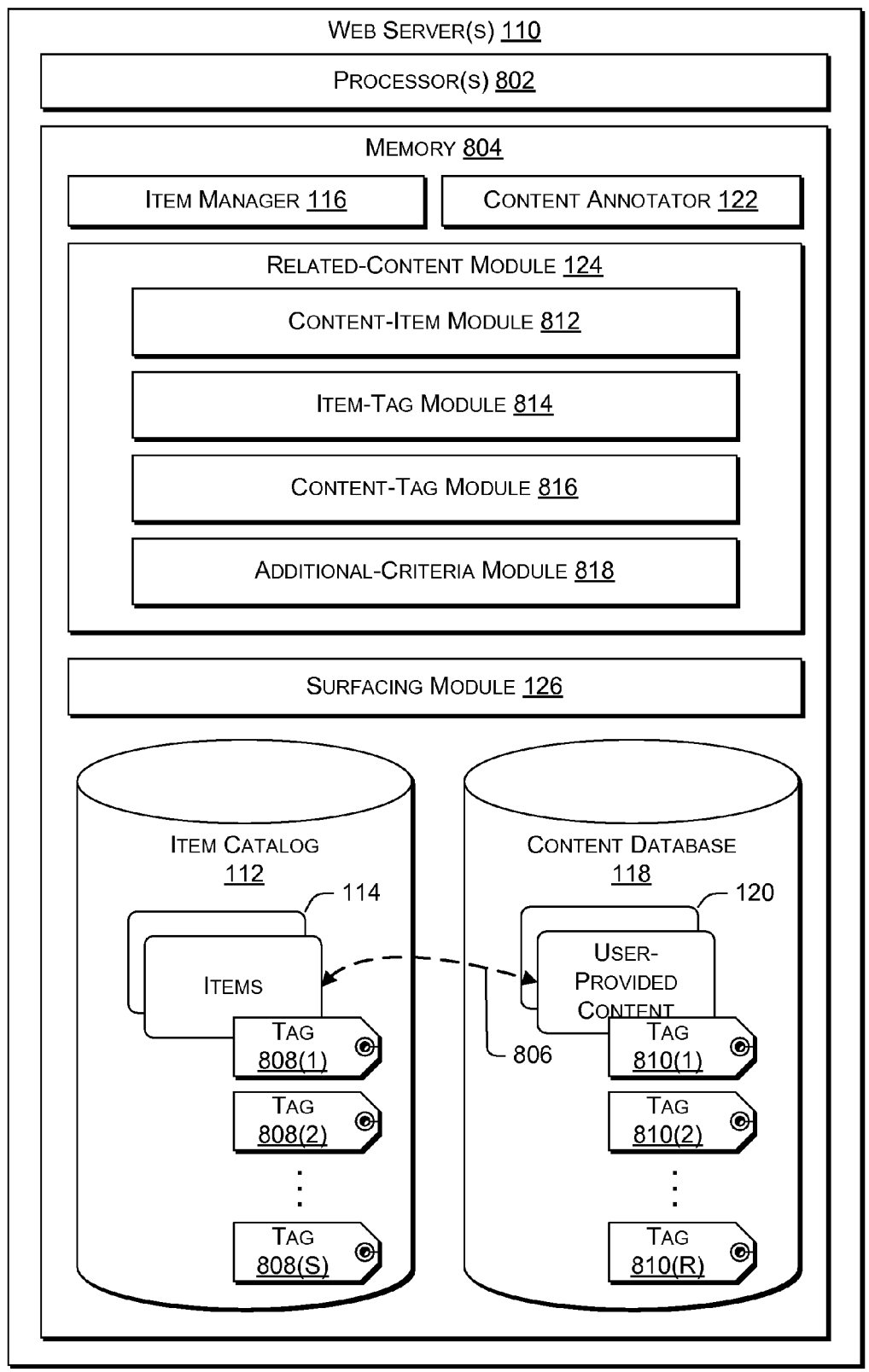
FIG. 8 is a block diagram illustrating, among other things, embodiments of modules in a related-content module from FIG. 1.

Having described illustrative screen renderings of user-provided content and the surfacing of related content, FIG. 8 and an accompanying discussion illustrate and describe illustrative modules that may determine a piece of content's relatedness to another piece of content. Each of the illustrated modules are implemented as software or computer-executable instructions stored in memory and executed by one or more processors.

FIG. 8 thus illustrates an example implementation of related-content module 124 from FIG. 1. Illustrated web servers 110(1)-(N) have processing capabilities and memory suitable to store and execute computer-executable instructions. In this example, web server(s) 110 include one or more processors 802 and memory 804. Memory 804 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As illustrated, item catalog 112 store item records 114, each of which may be associated with zero, one, or more tags 808(1), (2), . . . , (S). Content database 118, meanwhile, includes content such as user-provided content 120. In some instances, this content comprises customer catalog pages, as described and illustrated above. Each piece of user-provided content 120 may reference zero, one, or more of items 114, as arrow 806 indicates. For instance, a piece of user-provided content may illustrate multiple items and may be associated with hyperlinks to pages associated with these items, as described above in regards to customer catalog pages. Again, these illustrated items may be associated with one or more of tags 808(1)-(S). Similarly, each piece of user-provided content 120 may itself be associated with zero, one, or more of tags 810(1)-(R).

As discussed above in regards to FIG. 1, related-content module 124 may analyze a particular piece of user-provided content and rank multiple other pieces of user-provided content according to a relatedness between the particular piece of user-provided content and each of the other pieces of content. To do so, related content-module 124 may include a content-item module 812, an item-tag module 814, a content-tag module 816, and an additional-criteria module 818. Each of these modules may assign score(s) to each of the other pieces of content. These scores may be weighted and/or summed for each piece of content to determine a similarity score, such as scores 128(2)-(N) illustrated in FIG. 1.

Content-item module 812 functions to identify, within a particular piece of user-provided content such as a customer catalog page, any items that are referenced in the content. For instance, content-item module may determine whether the content, such as the image, illustrates any items and/or is associated with any hyperlinks that are associated with items. In some instances, module 812 identifies items within the content with reference to associated hyperlinks.

Once content-item module 812 identifies items referenced by a particular piece of content, then module 812 identifies items in other pieces of content. Once module 812 identifies these items, then module 812 compares the items referenced by each of the other pieces of content with the items referenced by the particular piece of user-provided content. The content-item module 812 then assigns a score to each of the other pieces of content based on a number of matching items (e.g., absolutely, with reference to a ratio, etc.).

For instance, if the particular piece of content comprise customer catalog page 200, then content item module 812 may identify the illustrated MP3 player, speakers, and headphones. If another first piece of content references two of these items, while a second piece of content references all three, then content-item module 812 may assign a higher score to the second piece of content.

Content-item module 812 also determines a similarity strength between non-matching items and assigns a score to each of the multiple other pieces of user-provided content based on these similarities strengths. For instance, imagine again that the particular piece of content is customer catalog page 200. Imagine also that another first piece of content references a vacuum cleaner with a second piece of content references a car stereo. Content-item module 812 may determine that the car stereo is much more similar to the MP3 player (as well as the speakers and the headphones) illustrated in page 200 than is the vacuum cleaner. As such, the second piece of content would receive a larger score for this piece of the analysis. Module 812 may implement any well-known or novel techniques to determine these similarity strengths between items.

Next, item-tag module 814 functions to receive the items identified (by content-item module 812) in both the particular piece of content and the other pieces of content and determine tags associated with these items. That is, item-tag module 814 analyzes the items and, with reference to item catalog 112, determines the tags that are associated with these items.

Once item-tag module 814 determines these tags, module 814 compares the tags associated with the items referenced by each of the other pieces of content with the tags associated with the items referenced by the particular piece of user-provided content. Module 814 then assigns a score to each of the other pieces of content based on a number of matching tags on these items (e.g., absolutely, with reference to a ratio, etc.).

For instance, again assume that the particular piece of content comprise customer catalog page 200. Assume also that the three illustrated items are associated with 52 tags. If another first piece of content references items that are associated with 45 of these 52 tags, while a second piece of content references items associated with only 24 of the 45 tags, then module 814 may assign a higher score to the first piece of content.

Additionally, item-tag module 814 may also determine tags that are related to the tags associated with the items referenced by the particular piece of content. Module 814 may determine these related tags by any well-known or novel means. Module 814 may then compare these related tags with the tags (and/or related tags) associated with the items referenced by the other pieces of content in determining a similarity score, and so on and so forth. In some instances, direct-tag matches are weighted more heavily in calculating a score than are related-tag matches.

Next, content-tag module 816 functions to determine tags associated with the particular piece of content and the multiple other pieces of content. That is, content-tag module 816 analyzes user-provided content 120 and, with reference to content database 118, determines the tags that are associated with these pieces of content.

Once content-tag module 816 determines these tags, module 816 compares the tags associated with the particular piece of content with the tags associated with the multiple other pieces of content. Module 816 then assigns a score to each of the other pieces of content based on a number of matching tags (e.g., absolutely, with reference to a ratio, etc.).

For instance, again assume that the particular piece of content comprise customer catalog page 200. Assume also that page 200 itself has been associated with 22 tags. If another first piece of content has been associated with 15 of these 22 tags, while a second piece of content has been associated with only nine of the 22 tags, then module 816 may assign a higher score to the first piece of content.

Content-tag module 816 may also determine tags that are related to the tags associated with the particular piece of content. Module 816 may then compare these related tags with the tags (and/or related tags) associated with the other pieces of content in determining a similarity score, and so on and so forth. Again, in some instances, direct-tag matches are weighted more heavily in calculating a score than are related-tag matches.

Additionally, note that in determining similarity scores, tags (and related tags) that are associated with the particular piece of content itself (e.g., the catalog page 200) may also be compared with the tags (and related tags) on the items referenced by the other pieces of content. Similarly, tags (and related tags) that have been associated with items referenced by the particular piece of content may be compared with the tags (and related tags) that are associated with the other pieces of content themselves.

In addition to leveraging tags and referenced items, related-content module 124 may employ additional-criteria module 818 when assigning similarity scores. Module 818 may assign scores to the other pieces of content based on a number of factors, including: a sales rank of referenced items, a conversion rate of a piece of user-provided content, user feedback such as a helpfulness rating of a piece of user-provided content, a reputation of a person who posted a piece of user-provided content, a price of referenced items, a product, category, or rating of referenced items, or any other generic or user-customized factor that website 106 may wish to use when deciding which pieces of content to surface as related content.

In some instances, a "conversion rate" of a piece of content represents a measure of which the content has led other users to engage in a desired manner. For instance, a conversion rate may measure how often users purchase a particular item after navigating to a particular piece of content (e.g., within a certain amount of time after viewing the content). A conversion rate may also measure how often users viewed an item detail page of an item after viewing the content, how often users added an item to a wish list after viewing the content, how often users were shown an advertisement after viewing the content, how often users registered with website 106 after viewing the content, or how often users engaged in any other action tracked by website 106.

A "reputation" of a particular user, meanwhile, may generally represent a measure of trust assigned to the particular user. That is, a user's reputation represents a degree to which other users should trust the particular user. This reputation may be based on other users's votes indicating if the particular user has previously used website 106 in an appropriate manner, indicating if the particular user's previously provided content has been helpful, or the like.

For instance, imagine that a first piece of user-provided content references items that, as a whole or individually, have a higher sales rank than items referenced by a second piece of content. Here, module 818 may assign a higher score to the first piece of content than to the second piece. Similarly, if the first piece of content has a higher rate of conversion (or a percentage of users who purchase an item in response to selecting the content) than does the second piece, then module 818 may assign a higher score to the first piece. Module 818 may apply similar principles based on helpfulness ratings of respective pieces of content. Finally, note that module 818 may employ some or all of these factors to assign scores or, additionally or alternatively, may employ some or all of these factors only as tiebreakers when needed to separate two or more similarly-scored pieces of content.

Once related-content module 124 has assigned similarity scores to (and potentially ranked) the other pieces of user-provided content, surfacing module 126 may surface some or all of this content based on the scores and/or the ranking. For instance, surfacing module 126 may surface the ten pieces of content deemed most related to customer catalog page 200. As illustrated in FIGS. 2-6, surfacing module 126 may illustrate this content (or icons representing this content) directly on customer catalog page 200. However, note that surfacing module 126 may also display these related pieces of content on many other pages, such as search results pages, and the like.

Illustrative Surfacing of Related Content

Figure 9:
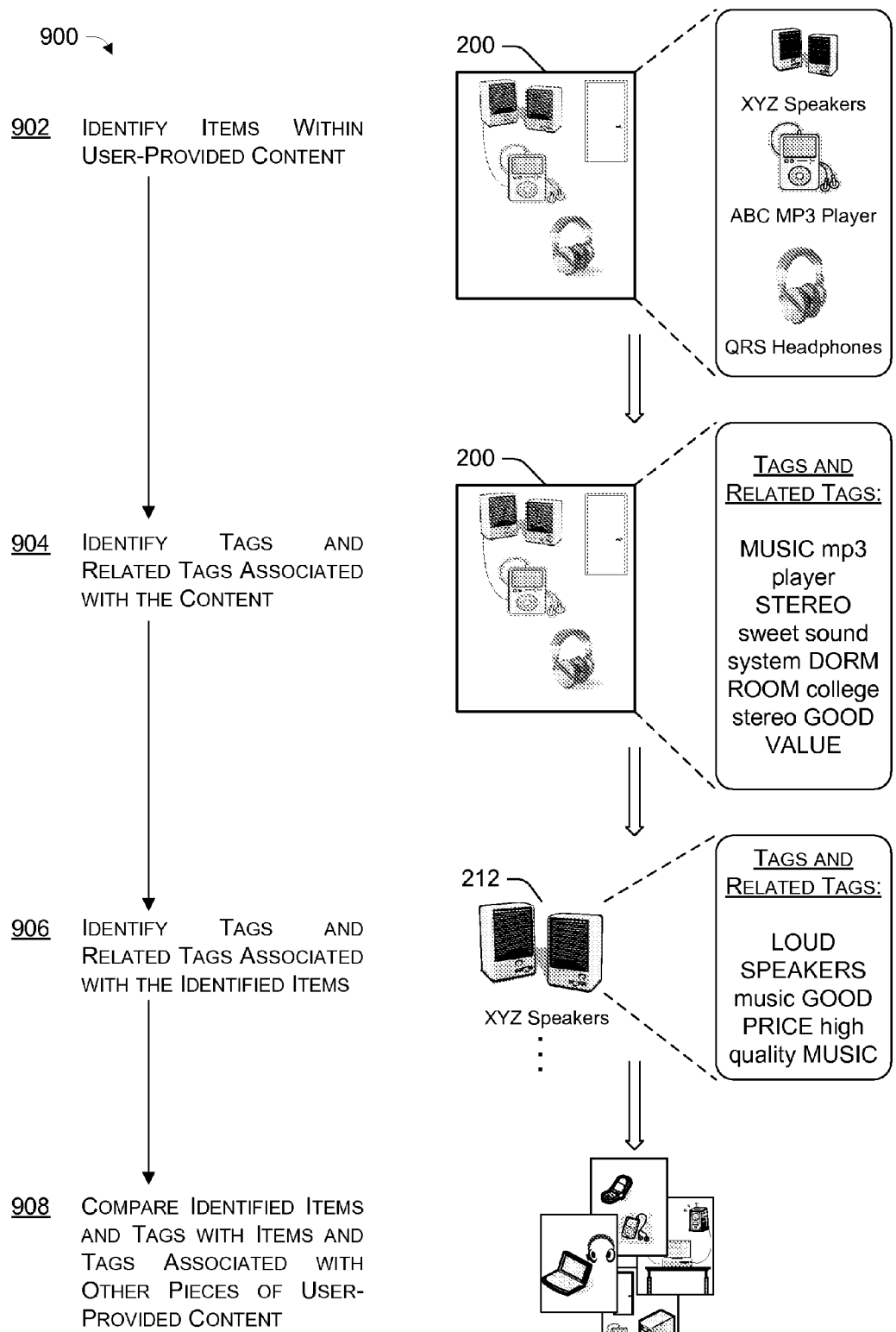
FIGS. 9-10 depict a functional flow diagram of an illustrative process for identifying and surfacing pieces of content that are related to a piece of user-provided content, such as a customer-annotated catalog page.
Figure 10:
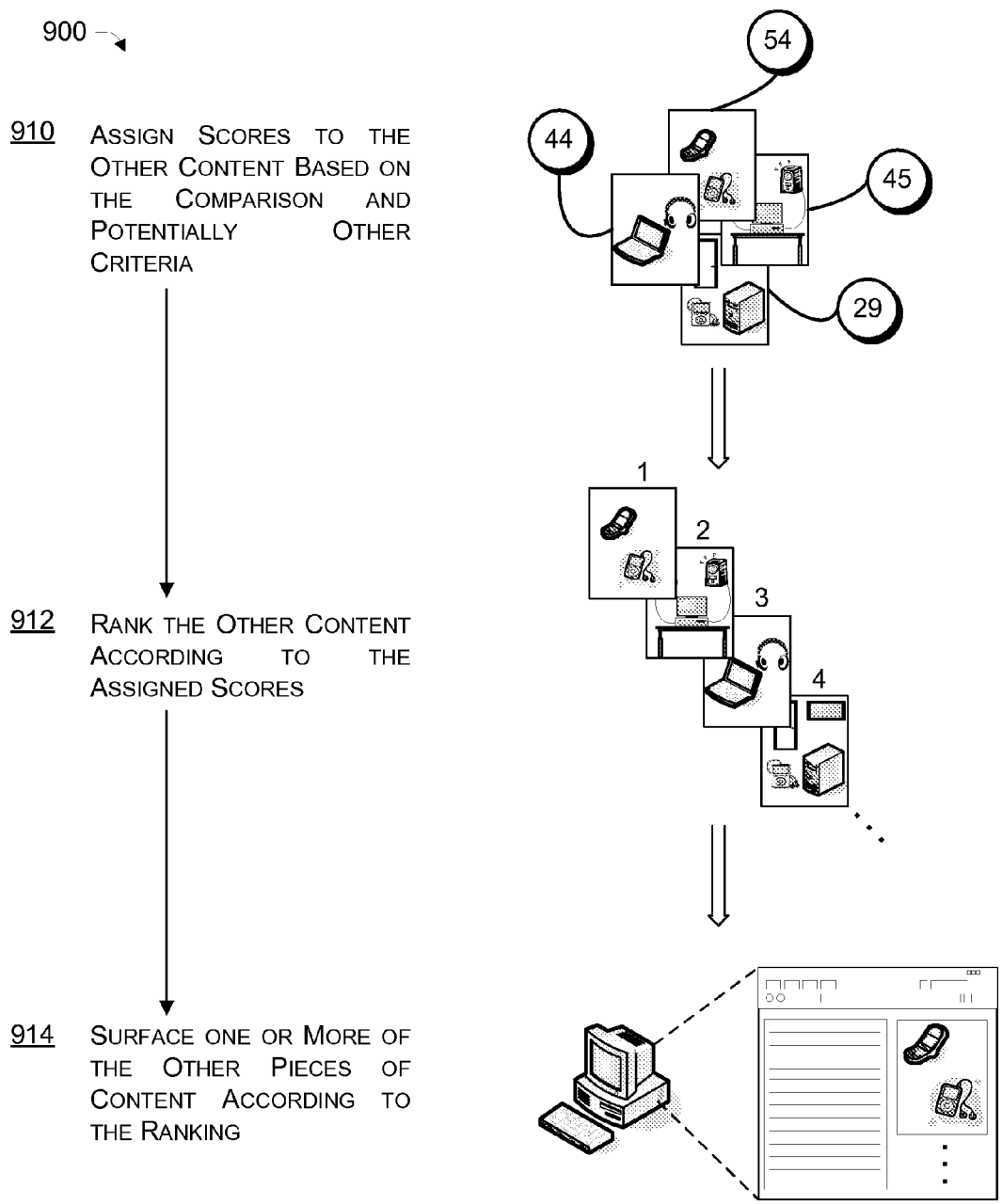

FIGS. 9-10 depict a functional flow diagram of an illustrative process 900 for identifying and surfacing pieces of content that are related to a particular piece of user-provided content, such as customer-annotated catalog page 200. Process 900, as well as subsequent processes described below, is illustrated as a logical flow graph, which represents a sequence of operations that can be implemented in hardware, software, or a combination thereof. In the context of software, the logical flow graph represents computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Process 900 includes operation 902, which represents identifying items within a piece of user-provided content, such customer catalog page 200. This may include identifying items that are illustrated, items that have been associated with hyperlinks, and/or items that have been referenced in other ways. Here, the XYZ speakers, ABC MP3 player, and QRS headphones have been identified as having been associated with a hyperlink to associated pages. Next, operation 904 identifies tags and related tags associated with catalog page 200 itself. FIG. 9 illustrates a collection of illustrative tags that are associated with the pages, including "music", "stereo", "good value", and others.

Next, operation 906 represents identifying tags and related tags associated with the items identified in operation 902. Here, tags associated with the speakers, the MP3 player, and the headphones are identified, as well as tags that are related to these identified tags. Operation 908 then compares the identified items and tags (and related tags) with items referenced by and tags associated with other pieces of user-provided content, as discussed above.

Process 900 continues in FIG. 10, which begins with operation 910. Here, a similarity score is assigned to each of the other pieces of content based on the comparison of operation 908. These scores may also be based on other criteria, such as sales ranks, conversion rates, user feedback, and the like. Operation 912 then ranks the content according to the scores assigned in operation 910. Finally, operation 914 surfaces one or more of the ranked pieces of content at least in part based on the ranking. In some instances, these pieces of content are displayed on a same page as the particular piece of user-provided content, such as customer-annotated catalog page 200.

Operation

Figure 11:
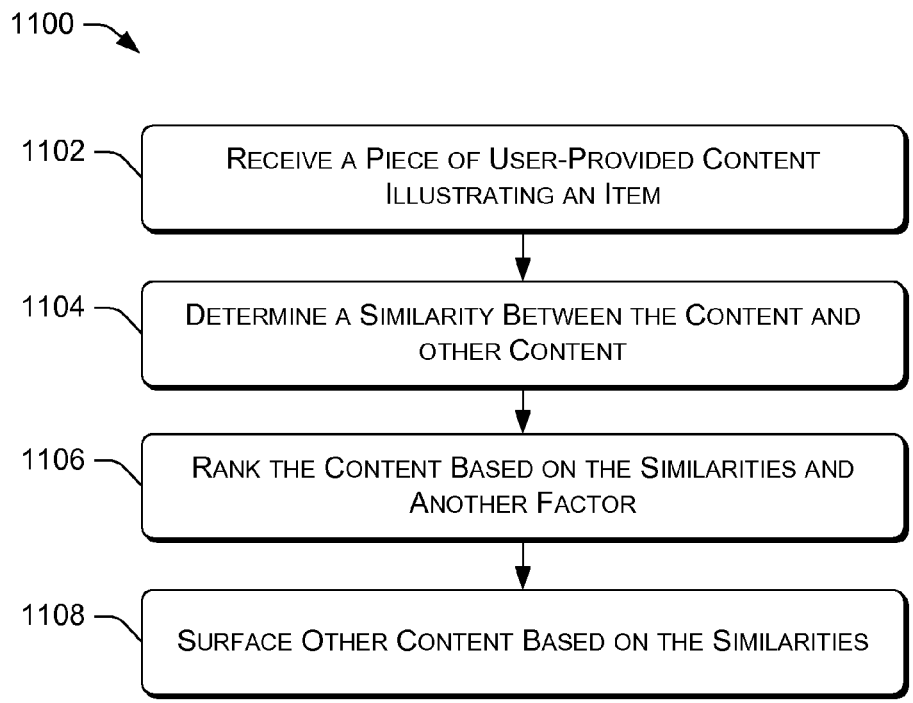
FIGS. 11-12 are flow diagrams of illustrative processes of identifying and surfacing pieces of related content.
Figure 12:
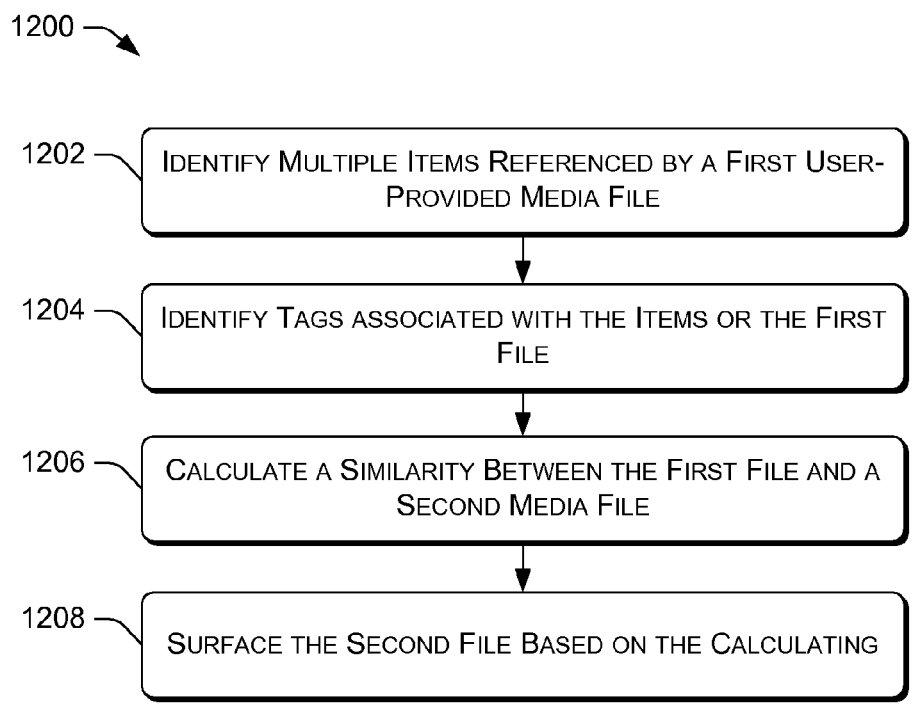

FIGS. 11-12 are flow diagrams of illustrative processes 1100 and 1200 of identifying and surfacing pieces of related content. As noted above, these processes comprise a sequence of operations that can be implemented in hardware, software, or a combination thereof.

Process 1100 includes operation 1102, which represents receiving a piece of user-provided content illustrating an item in an electronic catalog. Next, operation 1104 determines a similarity between the content and other pieces of user-provided content. Operation 1106 then ranks the content based on the determined similarities and, potentially, one or more other factors. Finally, operation 1108 surfaces one or more of the pieces of content based on the determined similarities and/or the ranking.

Process 1200, meanwhile, includes operation 1202. Here, multiple items referenced by a first user-provided media file are determined. Operation 1204 then identifies tags associated with these items and/or with the file itself. Next, operation 1206 calculates a similarity between the file and a second media file, which may or may not be provided by a user. Finally, operation 1208 surfaces the second file based at least in part on the calculating of operation 1206.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method implemented by a Web server, comprising:
   receiving, by the Web server, a first user-uploaded media file that visually represents at least a first item within an electronic catalog of items available for consumption;
   receiving an association between the first user-uploaded media file and a hyperlink pointing to the first item within the electronic catalog of items available for consumption;
   identifying the first item that the first user-uploaded media file visually represents by determining that the first user-uploaded media file is associated with the hyperlink;
   determining tags that users have associated with the first item;
   determining tags that are related to but different than the determined tags;
   searching multiple other user-uploaded media files to identify user-uploaded media files that visually represent the first item and one or more of: (i) an item that is related to but different than the first item; (ii) an item that is associated with one of the determined tags, or (iii) an item that is associated with one of the related tags;
   searching the multiple other user-uploaded media files to identify user-uploaded media files that: (i) are associated with one of the determined tags, or (ii) are associated with one of the related tags;
   ranking the identified user-uploaded media files;
   causing display of the first user-uploaded media file;
   causing display of the identified first item that the first user-uploaded media file visually represents adjacent to the first user-uploaded media file; and,
   causing display of one or more of the identified user-uploaded media files adjacent to the first user-uploaded media file and at least in part based on the ranking.

2. A method as recited in claim 1, wherein the user-uploaded media files comprise image files or video files.

3. A method as recited in claim 1, wherein an area of the first user-uploaded media file that approximately frames the first item is associated with a hyperlink that points to a page where the first item is available for consumption.

4. A method as recited in claim 3, wherein the page that is associated with the first item is an item detail page for the first item.

5. One or more computer-readable storage media storing computer-executable instructions that, when executed on one or more processors, cause the one or more processors to perform acts comprising:
   receiving a first user-uploaded media file that visually represents at least a first item within an electronic catalog of items available for consumption;
   receiving an association between the first user-uploaded media file and a hyperlink pointing to the first item within the electronic catalog of items available for consumption;
   identifying the first item that the first user-uploaded media file visually represents by determining that the first user-uploaded media file is associated with the hyperlink;
   determining tags that users have associated with the first item;
   determining tags that are related to but different than the determined tags;
   searching multiple other user-uploaded media files to identify user-uploaded media files that visually represent the first item and one or more of: (i) an item that is related to but different than the first item; (ii) an item that is associated with one of the determined tags but different than the first item, or (iii) an item that is associated with one of the related tags but different than the first item;
   searching the multiple other user-uploaded media files to identify user-uploaded media files that: (i) are associated with one of the determined tags, or (ii) are associated with one of the related tags;
   ranking the identified user-uploaded media files;
   causing display of the first user-uploaded media file;
   causing display of the identified first item that the first user-uploaded media file visually represents adjacent to the first user-uploaded media file; and causing display of one or more of the identified user-uploaded media files adjacent to the first user-uploaded media file and at least in part based on the ranking.

6. One or more computer-readable storage media as recited in claim 5, wherein the user-uploaded media files comprise image files or video files.

7. One or more computer-readable storage media as recited in claim 5, wherein an area of the first user-uploaded media file that approximately frames the first item is associated with a hyperlink that points to a page where the first item is available for consumption.

8. One or more computer-readable storage media as recited in claim 7, wherein the page that is associated with the first item is an item detail page for the first item.

9. A system comprising:
   one or more processors; and
   one or more computer-readable storage media storing computer-executable instructions that, when executed on the one or more processors, cause the one or more processors to perform acts comprising:
      receiving a first user-uploaded media file that visually represents at least a first item within an electronic catalog of items available for consumption;
      receiving an association between the first user-uploaded media file and a hyperlink pointing to the first item within the electronic catalog of items available for consumption;
      identifying the first item that the first user-uploaded media file visually represents by determining that the first user-uploaded media file is associated with the hyperlink;
      determining tags that users have associated with the first item;
      determining tags that are related to but different than the determined tags;
      searching multiple other user-uploaded media files to identify user-uploaded media files that visually represent the first item and one or more of: (i) an item that is related to but different than the first item; (ii) an item that is associated with one of the determined tags but different than the first item, or (iii) an item that is associated with one of the related tags but different than the first item;
      searching the multiple other user-uploaded media files to identify user-uploaded media files that: (i) are associated with one of the determined tags, or (ii) are associated with one of the related tags;
      ranking the identified user-uploaded media files;
      causing display of the first user-uploaded media file;
      causing display of the identified first item that the first user-uploaded media file visually represents adjacent to the first user-uploaded media file; and
      causing display of one or more of the identified user-uploaded media files adjacent to the first user-uploaded media file and at least in part based on the ranking.

10. A system as recited in claim 9, wherein the user-uploaded media files comprise image files or video files.

11. A system as recited in claim 9, wherein an area of the first user-uploaded media file that approximately frames the first item is associated with a hyperlink that points to a page where the first item is available for consumption.

12. A system as recited in claim 11, wherein the page that is associated with the first item is an item detail page for the first item.

\* \* \* \* \*